H. RENOLD.
DRIVING CHAIN.
APPLICATION FILED AUG. 16, 1913.

1,134,010. Patented Mar. 30, 1915.

Witnesses.
Joseph Shaw
Thos. M. Golden

Inventor:
Hans Renold.
Per William E. Richards
Attorney.

UNITED STATES PATENT OFFICE.

HANS RENOLD, OF MANCHESTER, ENGLAND.

DRIVING-CHAIN.

1,134,010.  Specification of Letters Patent.  Patented Mar. 30, 1915.

Application filed August 16, 1913. Serial No. 785,089.

*To all whom it may concern:*

Be it known that I, HANS RENOLD, a citizen of Switzerland, and resident of Manchester, in the county of Lancaster, England, have invented certain new and useful Improvements in Driving-Chains, of which the following is a specification.

This invention relates to improvements in the "silent or inverted tooth" type of driving chains. This type of driving chains is generally provided with guide links arranged either on each side or in the middle of the chain. In either case great difficulty has hitherto been experienced in so forming the said guide links, that their extension will be equal to that of the ordinary or driving chain links when under load, to prevent distortion of the link studs or rivets and fracture or breakage of the links. Further, when arranging the said guide links on each side of the chain, they were loosely held on the body of the stud or rivet by a small washer being riveted on the outside on the neck of the stud or rivet. In practice it has been found that the said riveting causes the end of the body of the link stud or rivet to slightly swell, sufficiently to interfere with the free turning of the stud or rivet and the correct pitching of the outer links.

My invention has for its object to provide for each side of the chain, a form of guide whereby not only all the said defects are entirely satisfactorily overcome, but every link stud or rivet will also have a regular rotary movement imparted when the chain passes over the sprocket wheel, which insures equal wear of the link studs or rivets and the holes in the chain links. To this end according to my invention, I dispense with the said guide links and employ in lieu thereof either on each link stud or rivet, or on alternate link studs or rivets or ends thereof, washers or disks so connected and arranged that besides serving as lateral guides for the chain they cause the link stud or rivet to rotate each time the chain passes over the sprocket wheel, thus forming circular or rotary guides. I also so rivet and fix the said guide washers or disks on the neck and partly along the body of the stud or rivet as to cover the portion of the stud or rivet liable to swell on riveting, thus preventing irregular pitching of the chain links. I attain these objects by the means illustrated in the accompanying sheet of drawings, in which—

Figure 1:
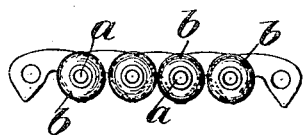
Figure 3:
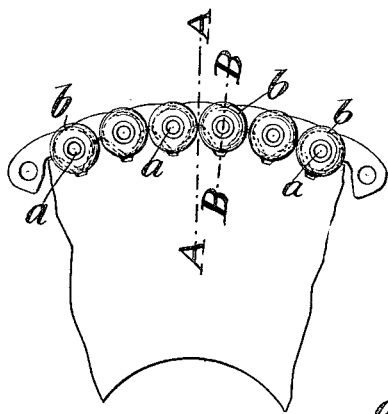
Figure 4:
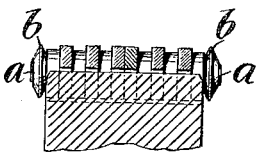
Figure 2:
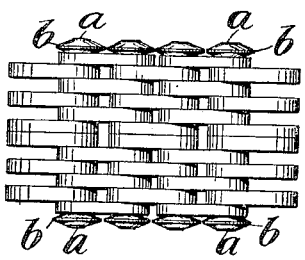
Figure 5:
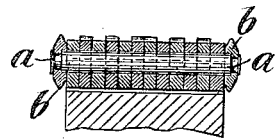
Figure 6:
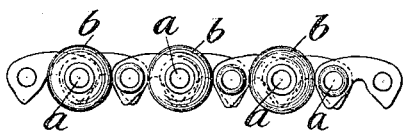
Figures 9, 10:

Figures 1 and 2 are respectively a side elevation and a plan of a chain provided with guide washers or disks arranged in accordance with one embodiment of my invention. Fig. 3 is a side elevation of a part of a sprocket wheel and chain in position thereon. Figs. 4 and 5 are cross sections of the latter figure on lines A—A and B—B respectively. Fig. 6 is a side elevation, Figs. 7 and 8 plans, showing chains constructed in accordance with other embodiments of my invention. Figs. 9 and 10 are respectively a cross section of the guide washer or disk and an elevation of the link stud or rivet on an enlarged scale.

Similar letters refer to similar parts throughout the several views.

Figure 7:
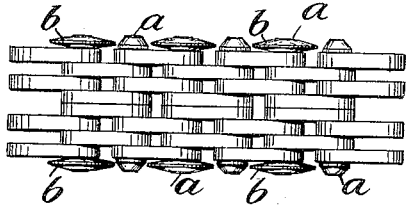
Figure 8:
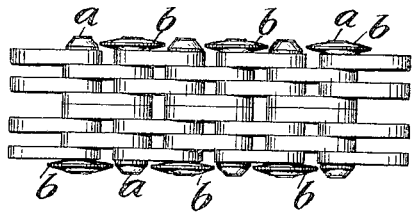

In carrying out my invention and referring to Figs. 1, 2, 3, 4 and 5 according to one embodiment, I employ upon each link stud or rivet $a$, a guide washer or disk $b$, which washers are rigidly secured to the neck of the link studs or rivets $a$ and made much larger in diameter than the washers ordinarily used on the neck of the link stud or rivet, so as to project from each side of the chain link teeth and come into frictional contact with the sides of the sprocket wheel teeth, see more particularly Figs. 3 and 5, and together with the link stud or rivet to be turned thereby. According to further embodiments of this part of my invention, I may employ guide washers or disks $b$ on the ends of every alternate link stud or rivet as shown in Figs. 6 and 7, or on every alternate end of the link stud or rivet, as shown in Fig. 8.

Referring more particularly to Figs. 9 and 10 according to another embodiment of my invention, I rigidly secure the guide washer or disk $b$ to the link stud or rivet $a$ by forming in the former, a hole $c$, $d$ of two different diameters providing a shoulder $e$ between the same. The smaller part $c$ of the said hole is of a diameter to receive the neck of the link stud or rivet, and the larger part is to receive the body of the link stud or rivet $a$ and is a tight fit on the same. When the stud or rivet neck is riveted, the small part $c$ of the hole of the washer of the disk $a$ is filled up and any swelling which takes place at the end of the body of the stud or rivet, is buried wedge-wise in the larger part $d$ of the hole of the washer or disk, thus fixing the washer or disk ever so much more firmly on the stud or rivet and enabling it to act as a guide. As this swelling takes place at the end of the stud or rivet body only, it does not affect that part of the stud or rivet which revolves in the chain links.

As will be readily seen from Figs. 1–8 the described improvements also permit of composing each series of chain links of an equal number of links and of equal tensile strength, thus making the chain throughout of equal strength and elasticity.

I claim:

1. In a driving chain, link studs or rivets and a washer rigidly secured to the ends of the said studs or rivets, of a diameter large enough to bear against the sides of the sprocket wheel to guide the chain laterally and by frictional contact with the said sides intermittently rotate the said link studs or rivets, for the purpose specified.

2. In a driving chain, link studs or rivets and a washer rigidly secured to the ends of the said studs or rivets, of a diameter large enough to bear against the sides of the sprocket wheel to guide the chain laterally and by frictional contact with the said sides intermittently rotate the said link studs or rivets, the said washer being employed at both ends of the link stud or rivet, for the purpose specified.

3. In a driving chain, link studs or rivets and a washer rigidly secured to the ends of the said studs or rivets, of a diameter large enough to bear against the sides of the sprocket wheel to guide the chain laterally and by frictional contact with the said sides intermittently rotate the said link studs or rivets, the said washer having a hole of two different diameters forming a shoulder, the smaller part of which is adapted to receive the neck and the larger part the body of the stud or rivet, for the purpose specified.

4. In a driving chain, link studs or rivets and a washer rigidly secured to the ends of the said studs or rivets of a diameter large enough to bear against the sides of the sprocket wheel, in combination with series of links connecting the said studs or rivets, the consecutive series of which are the same in numbers and of equal strength and elasticity, for the purpose set forth.

Signed at Manchester in the county of Lancaster, England this 11th day of July A. D. 1913.

HANS RENOLD.

Witnesses:
ALFRED BONHARDT,
STANLEY E. BRAMALL.

Copies of this patent may be obtained for five cents each, by addressing the "Commissioner of Patents, Washington, D. C."